United States Patent [19]
Konada

[11] Patent Number: 6,064,060
[45] Date of Patent: May 16, 2000

[54] NEAR-FIELD SCANNING OPTICAL MICROSCOPE

[75] Inventor: Takeshi Konada, Suginami-ku, Japan

[73] Assignee: Olympus Optical Co., Ltd., Tokyo, Japan

[21] Appl. No.: 09/061,244

[22] Filed: Apr. 17, 1998

[30] Foreign Application Priority Data

Apr. 18, 1997 [JP] Japan ................................. 9-101841

[51] Int. Cl.$^7$ ................................................ H01J 37/00
[52] U.S. Cl. ..................... 250/234; 250/306; 250/307; 73/105
[58] Field of Search .................................. 250/216, 234, 250/235, 306, 307; 73/105

[56] References Cited

U.S. PATENT DOCUMENTS

| | | | |
|---|---|---|---|
| 5,107,114 | 4/1992 | Nishioka et al. | 250/306 |
| 5,508,517 | 4/1996 | Onuki et al. | 250/306 |
| 5,705,814 | 1/1998 | Young et al. | 250/306 |

FOREIGN PATENT DOCUMENTS 6-160719   6/1994   Japan.

OTHER PUBLICATIONS

Toshiko Kataoka and Katsuyoshi Endo, Small Protrusion Type Near–Field Optical Microscope.

*Primary Examiner*—John R. Lee
*Attorney, Agent, or Firm*—Pillsbury Madison & Sutro LLP

[57] ABSTRACT

A near-field scanning microscope is constructed so that a probe is brought close to a specimen and is relatively moved with respect to the surface of said specimen to scan a region proximate to the surface of the specimen and light derived through the probe is detected by a photodetector to thereby measure the optical property of the specimen. This optical microscope is provided with a plurality of probes and a switching mechanism for selecting one of the plurality of probes to place a selected probe close to the specimen. In this way, measurements can be made under different conditions in regard to a particular specimen.

20 Claims, 4 Drawing Sheets

NEAR-FIELD SCANNING OPTICAL MICROSCOPE

BACKGROUND OF THE INVENTION

1. Field of the Invention

This invention relates to a near-field scanning optical microscope in which a probe and a specimen are placed close to each other and are moved relative to each other in a direction nearly parallel to the surface of the specimen so that a region proximate to the surface of the specimen is scanned with the probe, and light derived through the probe is detected by a photodetector to thereby measure optical properties of the specimen.

2. Description of Related Art

A near-field scanning optical microscope is adapted to use a probe whose aperture or radius of curvature at the tip is smaller than the wavelength of light for measuring optical properties of a minute region. Thus, this microscope, which can bring about a resolving power corresponding to the order of the diameter of the probe tip (several tens of nanometers or less), is superior to an optical microscope whose resolving power is restricted by a diffraction limit. In this way, it is expected that such near-field scanning optical microscopes will find increasingly wide applications and uses in the fields of industry and medicine in future.

Thus, in order to realize the near-field scanning optical microscope in which such a high resolving power is obtained, many proposals have been made with respect to measuring methods and structures. For example, methods of detecting optical information are known by those in which illumination light is rendered incident on the back surface of the specimen so that an evanescent wave produced above the front surface (which is hereinafter referred to simply as the surface) thereof Is introduced into the probe for detection; those in which the specimen is irradiated with illumination light from above the surface thereof so that scattered light from the specimen is introduced into the probe with a minute aperture and is detected or reflected light from the probe is detected; and those in which illumination light is emitted from the probe with a minute aperture to detect transmitted light or scattered light from the specimen.

Further, methods for measuring a distance between the specimen and the probe in scanning a region proximate to the surface of the specimen, are known by those in which, in order to utilize intensity attenuation characteristics of the evanescent wave in a perpendicular direction thereof, illumination light is rendered incident on the back surface of the specimen and an evanescent wave produced above the surface of the specimen is detected and measured, and those in which a technique used in an atomic force microscope is utilized to optically detect and measure the displacement of the probe caused by a force exerted between the specimen and the probe.

The near-field scanning optical microscope is constructed so that such technical means are selectively used. In scanning operation, light existing in the vicinity of the surface of the specimen is captured and measured by scanning the specimen while controlling the distance between the specimen and the probe to hold it constant, while maintaining the distance to a predetermined setting value, or while controlling the detected intensity of light to hold it constant. In this way, the surface profile of the specimen or a difference in optical property (absorptance, refractive index, etc.) of the order such that it cannot be measured by an ordinary optical microscope can be imaged on a display such as a TV monitor.

Here, a prior art example of the near-field scanning optical microscope thus constructed is specifically explained with reference to FIG. 1. This example, similar to that disclosed in Japanese Patent Preliminary Publication No. Hei 6-160719 for instance, utilizes the technique used in the atomic force microscope to control a relative distance between the surface of the specimen and the tip of the probe so that it is held constant. A specimen 1 is mounted on a specimen stage 2 constructed with a prism, and light emitted from a light source 3 is totally reflected by the back surface of the specimen 1 so that an evanescent wave is produced above the surface thereof. The specimen stage 2 is designed so that its mounting surface is moved in an X, Y, or Z direction by a scanner 4.

Above the surface of the specimen 1, a probe 5 is placed in such a way that its tip with a minute aperture is brought close to the surface of the specimen 1. In the prior art example, the scanner 4 is moved in the X or Y direction, and thereby a region proximate to the surface of the specimen 1 is scanned with the probe 5. By this scanning operation, the evanescent wave is converted through the probe 5 into a propagation wave, which is collected by an optical collecting system 6 and after passing through a pinhole 7, is detected by a photodetector 8. Detected optical information is introduced through a controller 9 into a computer 10 and is processed there into a signal so that it is displayed as the image of the near-field scanning optical microscope on a monitor 11.

Since the above scanning operation is performed in such a way that the distance between the surface of the specimen 1 and the probe 5 is kept constant, the prior art example utilizes the technique used in the atomic force microscope for this purpose. That is, it is known that if flexibility Is previously imparted to the probe 5, the probe 5 will be deflected by a force exerted between the specimen 1 and the probe 5 in accordance with a change of the distance therebetween. Hence, in the prior art example, light emitted from a light source 12 for probe position control is reflected by the back surface of the probe 5 and the reflected light is detected by a detector 13 for probe position control so that a change of the deflection angle of the probe 5 is taken as that of the reflection angle of the light. In response to its detected signal, the controller 9 moves the scanner 4 in the Z direction and controls it so that the deflection angle becomes constant, thereby maintaining a constant distance between the specimen 1 and the probe 5.

Alternatively, there is a technique of maintaining the distance constant in such a way that a piezoelectric scanner 14 for the probe driven by the controller 9 is provided and, at the same time as the scanning operation, the probe 5 is vibrated in a direction nearly normal to the surface of the specimen 1. This technique, called an AC mode in the atomic force microscope, is such that the constant distance is kept by utilizing the fact that when the probe 5 approaches the specimen 1, the amplitude of vibration is damped by a force exerted between the specimen 1 and the probe 5 or an input vibration is out of phase with the vibration of the probe 5.

The near-field scanning optical microscope of the prior art mentioned above, however, has two problems in practical use. One of these problems refers to the replacement work of the probe 5. Generally, in the microscope In which a probe whose tip has the shape of a minute needle is brought close to the specimen for scanning as in the near-field scanning optical microscope or the atomic force microscope, its resolving power for detection is governed by the probe. Thus, if the tip of the probe wears, or dust or dirt adheres to the tip, due to the specimen, predetermined performance will cease to be obtainable. Furthermore, the tip of the probe, because of its poor strength, may be damaged by errors during operation. Consequently, if such situations are brought about, the probe must be replaced.

The replacement of probes is made by following the procedure that (1) measurement is stopped, (2) a probe is separated from the specimen at a safe distance, (3) a fixing mechanism mounting the probe is removed from the entire device, (4) the probe is removed from the fixing mechanism, (5) a new probe is mounted, (6) the fixing mechanism is attached again to the entire device, (7) the new probe is brought close to the specimen, and (8) the measurement is started. Since, as already mentioned, the probe itself is extremely small, it is not easy to manipulate the probe. Moreover, in the case where the replacement work requiring such labor and time must be done in the midst of the observation of the specimen, the work becomes cumbersome. In particular, if probes are introduced into production lines of a shop, production efficiency will be seriously affected.

The other problem encountered in handling the near-field scanning optical microscope of the prior art is raised when a plurality of probes of different types must be used to measure the same sample. Near-field scanning optical microscopes, as already mentioned, are available in some types, depending on technical means used. Similarly, probes attached to such microscopes are available in many types, such as a probe with an aperture, a metallic probe with no aperture, and a functional probe whose tip is coated with fluorescent pigment. Since these probes have both merits and demerits, there is the need to consider their use in accordance with applications and kinds of specimens. Thus, whenever it is intended to measure a wide object a single microscope as in the case of use in a research institution, probes of different types must be replaced to select the most suitable probe. This impairs work efficiency.

An experimental example that detection sensitivity is governed by a difference in optical property between the specimen and the probe is known by, for example, Kataoka and Endo, "Small Portion Type Near-field Scanning Optical Microscope", J. Optics, Near-field Optical Research Group, First Research Discussion Drafts, pp. 33–39 (June, 1994). As will be understood from this publication, even if one of the probes which are identical in type is used, a specimen will be observed in a condition that a predetermined sensitivity is not obtained, unless a probe suitable for the specimen to be observed is selected and used. This brings about a measurement with degradation of an S/N ratio. In this way, even from this point of view, the most suitable probe must be selected by the replacement of a plurality of probes, but in this case also, it is very disadvantageous to carry out the replacement work stated above.

SUMMARY OF THE INVENTION

It is, therefore, an object of the present invention to provide a near-field scanning optical microscope in which a switching mechanism capable of previously setting a plurality of probes is provided and thereby these probes can be selectively switched and arranged in a scanning condition.

In order to achieve this object, the near-field scanning optical microscope according to present invention is designed so that a probe and a specimen are placed close to each other and are moved relative to each other in a direction nearly parallel to the surface of the specimen to thereby scan a region proximate to the surface of the specimen, and light derived through the probe is detected by a detector to thereby measure optical properties of the specimen. This microscope is equipped with a switching mechanism capable of setting a plurality of probes at the same time, and the switching mechanism is constructed so that these probes can be selectively switched and arranged in a scanning condition.

Further, the near-field scanning optical microscope of the present invention is provided with a mechanism capable of changing a distance between the probe being in a scanning condition and the specimen which are opposite to each other. Thus, when the switching mechanism is operated, the probe and the specimen are adequately spaced and then an alternative probe is placed in a scanning condition.

Still further, the near-field scanning optical microscope of the present invention is such that the plurality of probes possess different detection properties, and the switching mechanism switches these probes in turn for scanning so that the material of the specimen is identified in accordance with measuring results.

This and other objects as well as the features and advantages of the present Invention will become apparent from the following detailed description of the preferred embodiments when taken in conjunction with the accompanying drawings.

DETAILED DESCRIPTION OF THE PREFERRED EMBODIMENTS

Figure 1:
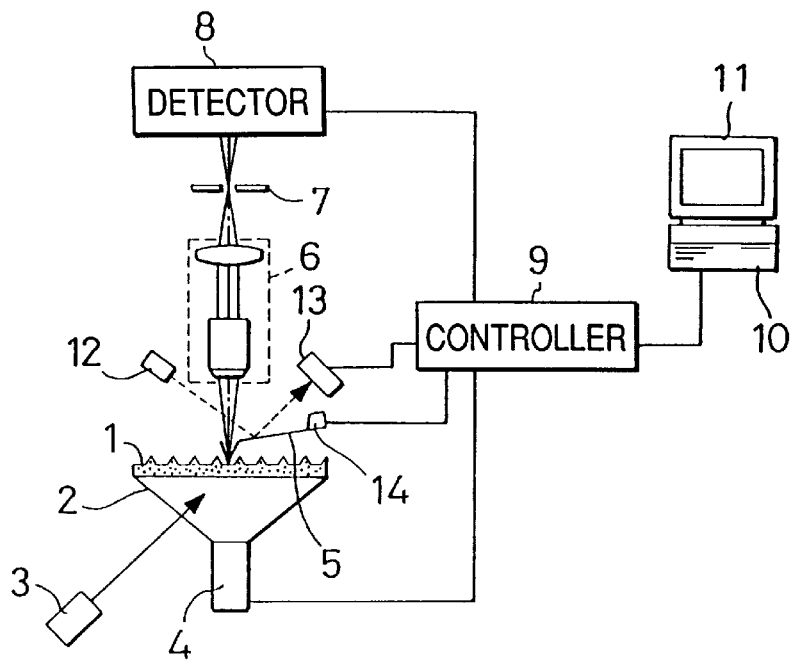
FIG. 1 is a view showing the construction of a conventional near-field scanning optical microscope.

In accordance with the embodiments shown in the drawings, the present invention will be explained in detail below. In the drawings, like numerals are used in like elements with respect to the prior art example shown in FIG. 1. Thus, the explanation of the like elements is omitted.

Figure 2:
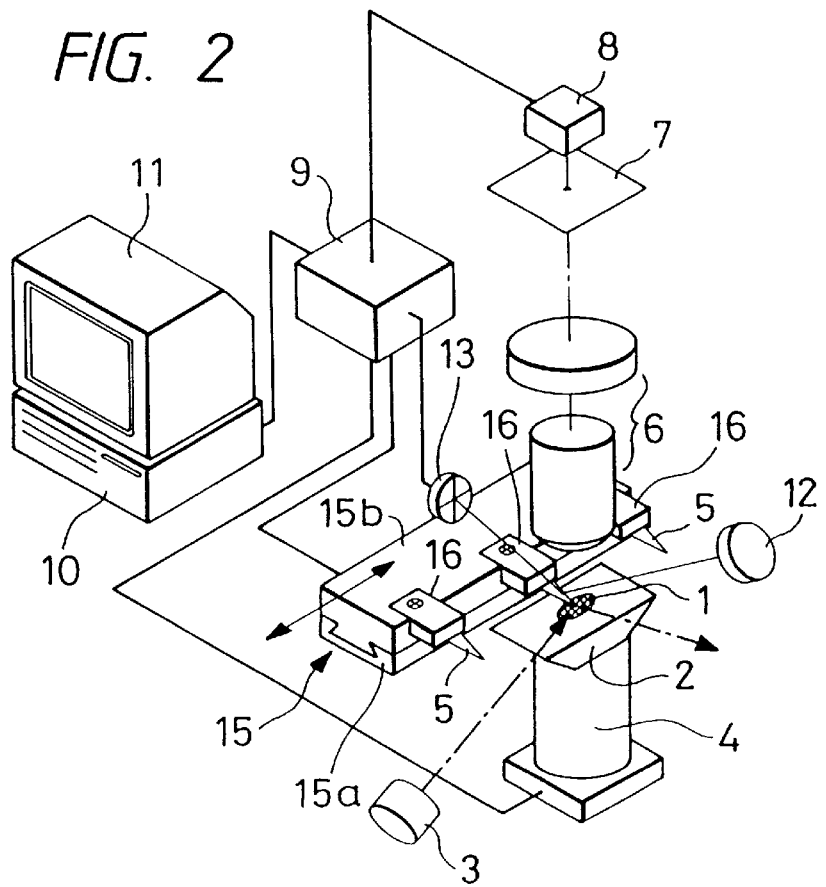
FIG. 2 is a perspective view showing the entire construction of a first embodiment of a near-field scanning optical microscope according to the present invention.
Figure 3A:
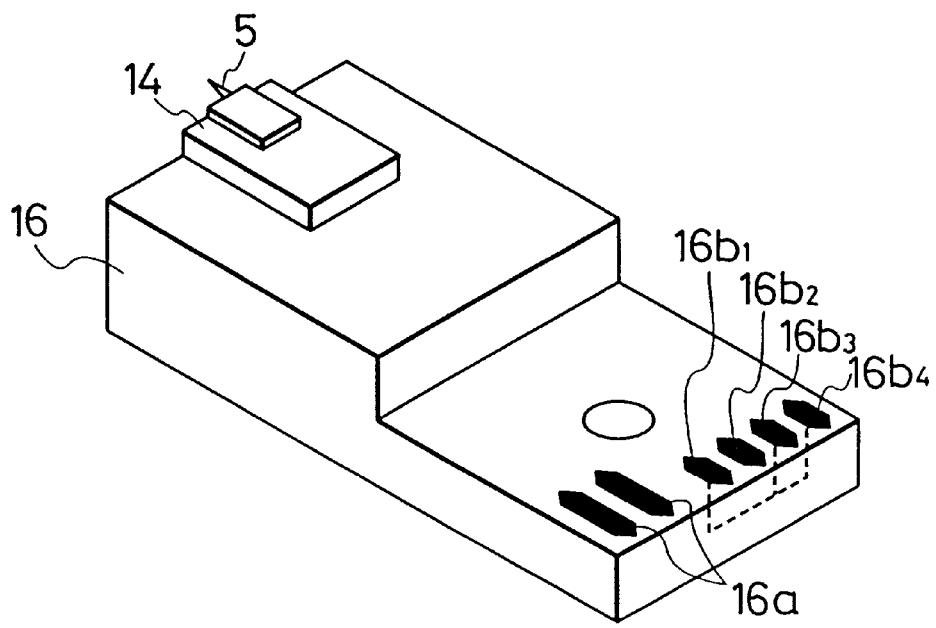
FIG. 3A is a perspective view showing a case where a probe is mounted to one of attachments shown in FIG. 2.
Figure 3B:
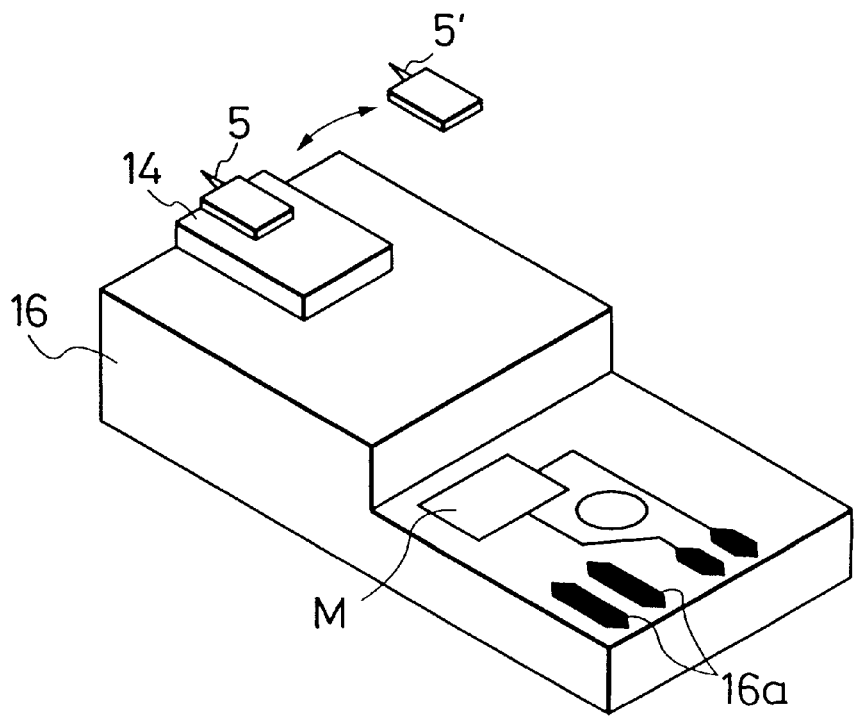
FIG. 3B is a perspective view showing another example of the attachment.
Figure 4:
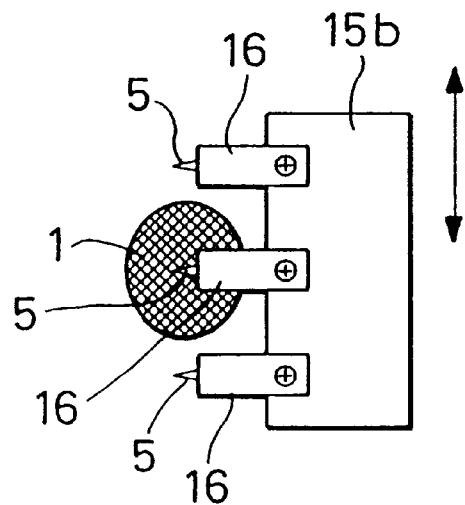
FIG. 4 is a plan view for illustrating a positional relationship between a plurality of probes and a specimen.

At the beginning, a description is given of the first embodiment with reference to FIGS. 2–4. The construction of this embodiment, as seen from FIG. 2, is substantially the same as that of the prior art example shown in FIG. 1 with the exception that a probe switching mechanism 15 is provided. The probe switching mechanism 15 is constructed with a fixed member 15a and a slide member 15b, which are combined through a dovetail groove. The slide member 15b can be slid, by an actuator not shown, in the direction of an arrow with respect to the fixed member 15a.

Three equally spaced attachments 16 are screwed on the slide member 15b. The attachments 16 have the same shape, and one of them is shown in FIG. 3A. In this figure, the attachment 16 of FIG. 2 is turned upside down. On the surface of the attachment 16 in FIG. 3A, the probe 5 is mounted through the piezoelectric scanner 14 for the AC mode already mentioned. Moreover, the attachment 16 is equipped with two electrodes 16a for energizing the piezoelectric scanner 14 and four electrodes $16b_1$, $16b_2$, $16b_3$, and $16b_4$ for distinguishing between the types of the probes 5 on a mounting surface relative to the slide member 15b.

The four electrodes $16b_1$–$16b_4$ are connected with, or disconnected from, one another in the attachment 16. In FIG. 3A, as indicated by broken lines, the electrodes $16b_1$, $16b_3$, and $16b_4$ are connected with one another in the attachment 16, but the electrode $16b_2$ is not connected. For the number of conduction patterns, there are 12 kinds including cases where all the four electrodes are connected with one another, two or three electrodes are connected at will, and the four electrodes are not connected at all. The slide member 15b is provided with four contacts, not shown, so that when the attachments 16 are mounted to the slide member 15b, these contacts come in contact with the electrodes $16b_1$–$16b_4$ and the conduction patterns can be electrically read. The conduction patterns are previously registered in the computer 10 and are set to correspond to respective types of the probes 5. Consequently, the type of each probe 5 is determined automatically by a detected conduction pattern so that what type of probe is used for measurement is recognized by the computer 10 and can be displayed on the monitor 11. In this way, the optical property of each probe 5 is inputted in advance and thereby the analysis of measured data is facilitated.

Subsequently, reference is made to the switching operation of the first embodiment thus constructed. In FIGS. 2 and 4, of the three probes 5 mounted to the slide member 15b, the probe 5 located at the middle position is in a scanning condition. In this condition, the specimen stage 2 mounting the specimen 1 is moved in a vertical or lateral direction of FIG. 2 by the scanner 4, so that optical information of a region proximate to the specimen 1 is contenuously introduced into the probe 5. In order to switch the probe 5 to another probe 5 from this condition and place the latter probe 5 in a scanning condition, a determination is made as to which of the probes 5 located at both ends in FIG. 4 should be used, and instructions regarding the determination are given to the computer 10.

The computer 10 thus controls the controller 9. First, a coarse adjustment loaded into the scanner 4 is operated to move downwardly the specimen stage 2 in FIG. 2 so that the specimen 1 and the probe 5 are adequately spaced and thereby are both prevented from being damaged. Subsequently, the controller 9 operates the actuator of the probe switching mechanism 15 to move the slide member 15b upwardly or downwardly in FIG. 4. The actuator stops operating when the slide member 15b is moved by a predetermined distance. After stopping the movement of the slide member 15b, the controller 9 operates again the coarse adjustment loaded into the scanner 4 to move the specimen stage 2 in a reverse direction so that the specimen 1 approaches the switched probe 5, and stops the specimen stage 2 at a predetermined position. This is a scanning condition where the switched probe 5 is used.

In the first embodiment, a plurality of probes 5 are mounted to the slide member 15b, which is moved linearly to thereby switch the probe 5 to another. However, the present invention is not necessarily limited to this system, and another system, for example, a switching mechanism of a turret system may be used. Further, in the first embodiment, when the probe is switched, the specimen stage 2 is moved to change the distance between the specimen 1 and the probe 5 which are opposite to each other, but, conversely, the coarse adjustment may be loaded into the probe switching mechanism 15 so that the probe 5 is moved in a direction perpendicular to the surface of the specimen 1.

In the first embodiment, in order to provide a plurality of conduction patterns, the four electrodes $16b_1$–$16b_4$ are arranged in each attachment 16, but the number of electrodes may be increased or decreased in accordance with the required number of conduction patterns. It is possible to increase the number of conduction patterns without increasing the number of electrodes, and diodes may be used for the wires of the attachment 16 to impart polarity to conduction. It is also possible to increase the number of conduction patterns by housing an integrated circuit. The method of reading the patterns need not necessarily be limited to a contact system such as that of the first embodiment, and marks of different reflectances, instead of the electrodes $16b_1$–$16b_4$, may be placed to the attachment 16 so that they are optically read.

In addition to the above description, it is also possible that, as shown in FIG. 3B, a non-volatile memory element M, such as a flash memory, is incorporated in the attachment 16 and thereby, for example, the type of a probe to be used and the date and hour for starting in the use of the probe are written in the memory element M. For such writing, a special writing device can be independently provided, or a writing mechanism may be added to the apparatus of the present invention to write after the attachment 16 is mounted to the apparatus. When a used probe 5 is removed from the attachment 16 and replaced with a new probe 5', the console of the computer 10 is controlled and information so far recorded is erased to write information on the new probe mounted to the attachment 16. With this technique, there is no need to provide a plurality of attachments in accordance with particular probes, and even where a new type of probe is available, it is only necessary to write data in the memory of the attachment. Thus, the technique excels in interchangeability of probes. Moreover, since simple memoranda such as use histories of probes can be written, data read from the attachment can be attached to control and measurement conditions of the working time of the probes.

Figure 5:
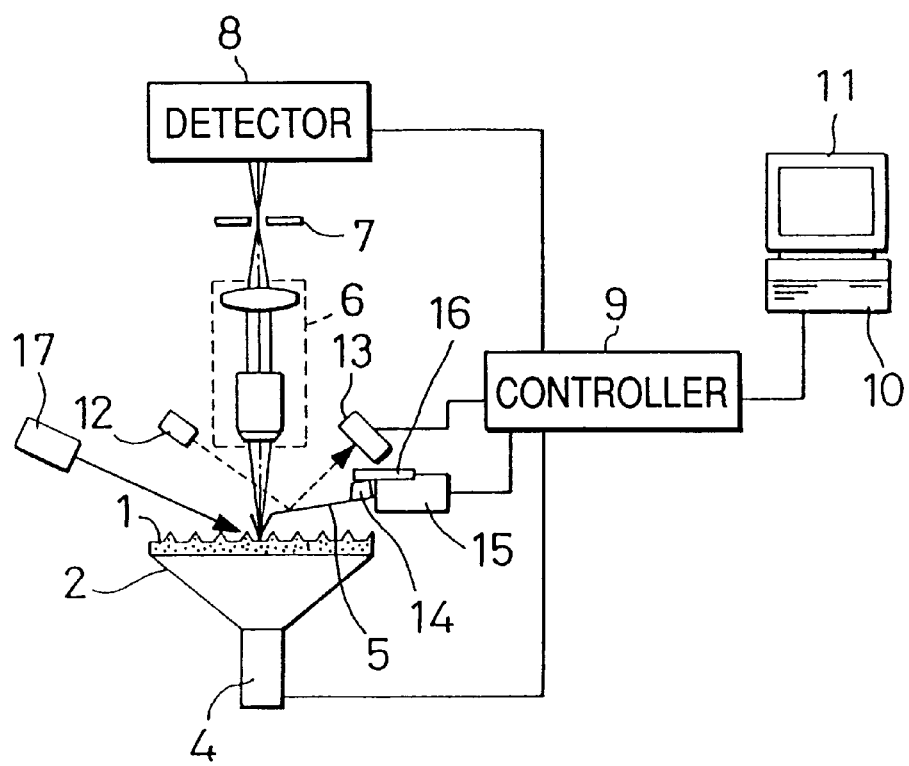
FIG. 5 is a view showing the construction of an application example of the first embodiment.
Figure 6:
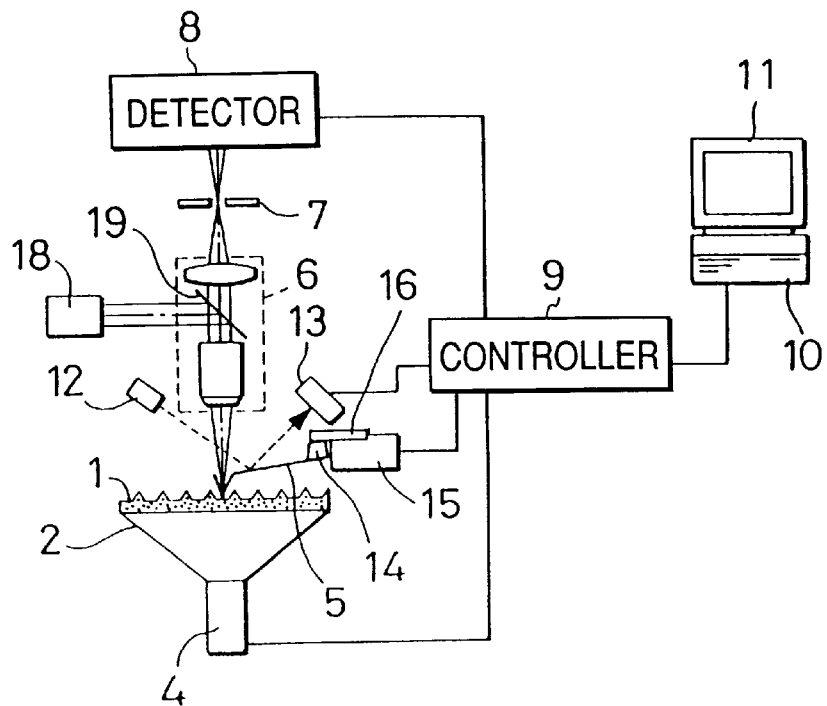
FIG. 6 is a view showing the construction of another application example of the first embodiment.

Here, two application examples of the first embodiment are briefly described using FIGS. 5 and 6. It has been already mentioned that near-field scanning optical microscopes are available in various types. FIGS. 5 and 6 conceptually show cases where the present invention is applied to near-field scanning optical microscopes of types different from that of the first embodiment. FIG. 5 refers to the case of the application to a microscope designed so that a light source 17 for irradiating the specimen 1 is placed obliquely above the specimen 1 and light reflected from the specimen 1 is introduced into the probe 5. FIG. 6 refers to the case of the application to a microscope designed so that light emitted from a light source 18 is introduced into the probe 5 through a beam splitter 19 placed in the optical collecting system 6 and the light emerging from the probe 5 and reflected by the specimen 1 is introduced again into the probe 5. For other details, the description of the first embodiment holds for the cases of these application examples.

For the first embodiment and the two application examples, in order to clarify differences with the prior art example shown in FIG. 1, control systems for maintaining a constant distance between the surface of the specimen 1 and the probe 5 during scanning are positively disclosed as the same system. However, such control systems have no direct relation to the present invention, and thus, for example, where a so-called shear force detection system is used that the tip of the probe 5, made of optical fiber, is vibrated in a direction nearly parallel with the specimen to detect its amplitude, light emitted from the light source 12 for probe position control may be directed to strike the side of the optical fiber probe 5 so that the distance between the specimen 1 and the probe 5 is controlled by its diffraction image. Additionally, it is considered that various systems are selectively used in accordance with required specifications.

Figure 7:
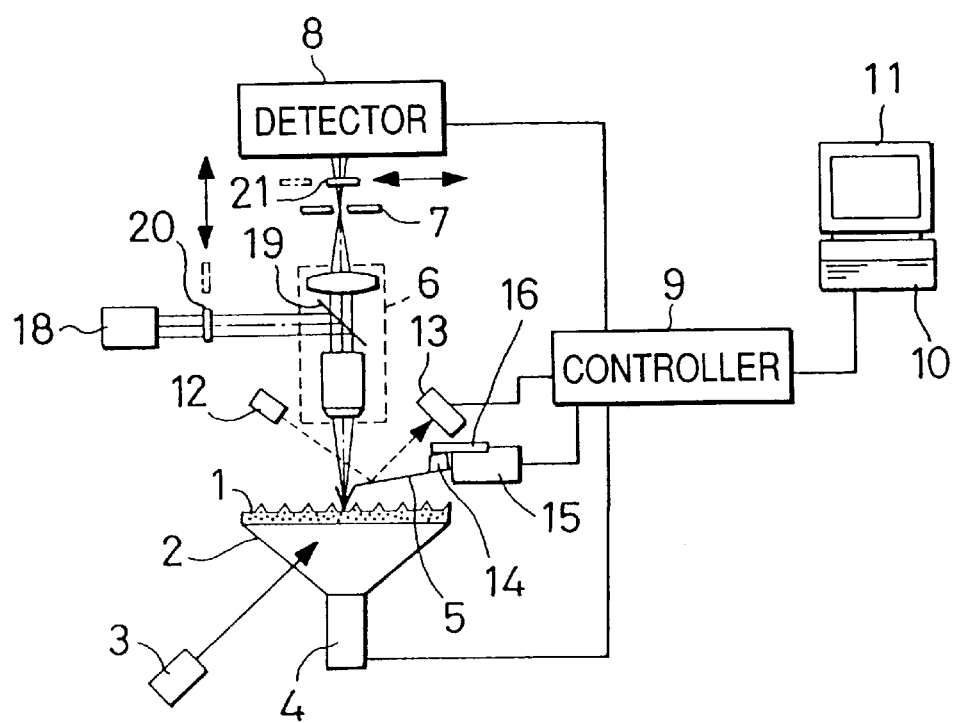
FIG. 7 is a view showing the construction of a second embodiment of the near-field scanning optical microscope according to the present invention.

Subsequently, the second embodiment is explained with reference to FIG. 7. In this embodiment, two light sources are provided for irradiating the specimen 1. Specifically, as in the first embodiment, the specimen 1 can be irradiated from its back surface by the light source 3. Moreover, similar to the application example shown in FIG. 6, the surface of the specimen 1 can be Irradiated with light emitted from the additional light source 18 through the beam splitter 19 and the probe 5. After irradiation, light from both the light sources is introduced into the probe 5 in the vicinity of the surface of the specimen 1 and is collected by the optical collecting system 6. Subsequently, the light passing through the pinhole 7 and detected by the photodetector 8 is transformed there into an electrical signal and after being signal-processed, is finally displayed as the image of the near-field scanning optical microscope on the monitor 11. Filters 20 and 21 can be inserted between the light source 18 and the beam splitter 19 and between the pinhole 7 and the photodetector 8, respectively. The probe switching mechanism 15 is the same as that in the first embodiment, and the description of the probe switching mechanism 15 in the first embodiment is also applied to the second embodiment.

The second embodiment is constructed as mentioned above, and thus where the light source 18 has the band of white light or is a laser light source for multiple-wavelength excitation and the probe 5 is switched, the filter 20 can be introduced into the optical path, with manual operation or in association with the probe switching operation, so that the wavelength of illumination light is suited to measurement. Also, there is a case where an aperture probe, scattering probe, and fluorescence probe are attached to the probe switching mechanism 15 and an attempt is made to switch over one of these probes to another. In this case, if only one light source for irradiation is provided for the specimen 1 and the fluorescence probe is used, the light source must be changed to excite this probe. The second embodiment, however, is equipped with two light sources, and hence, in the above case, it is possible to utilize the light source 3, in addition to the light source 18, for irradiation. Moreover, by introducing the filter 21, only fluorescence of the fluorescence probe can be detected, or the spectral reflectance of the specimen 1 can be measured. Also, the same is true for the case where a spectroscope is placed instead of the filter 21.

According to the second embodiment, it is possible to switch over a measurement with a so-called transmission type near-field scanning optical microscope using only the light source 3 to a measurement with a reflection type near-field scanning optical microscope using only the light source 18, and vice versa. Hence, for the switchover of the scattering and aperture probes, it is possible that when the opaque scattering probe is used thereby, only the light source 3 is employed for measurement, while when the aperture probe is used, only the light source 18 is employed for measurement.

Where the light source 3 is used to irradiate the specimen 1 from its back surface, the irradiated area of the specimen 1 cannot be diminished to the order of nanometers (nm) because of the diffraction limit, and thus the problem is raised that when light is introduced into the probe 5, a back noise is liable to occur. On the other hand, when silver or the like is slightly evaporated upon the mounting surface of the specimen stage 2 and the specimen 1 is irradiated to produce total reflection by the light source 3 so that surface plasmon is excited, information which serves to determine the material of the specimen 1 is acquired by measuring a change in detection intensity of the specimen 1.

The two light sources may be switched with manual operation, but as described in detail with respect to the first embodiment, the type of the probe 5 can be determined automatically by information derived from the attachment 16. It is thus favorable that the switching operation is performed automatically in accordance with the information of the probe 5 changed to the scanning condition. In this way, arduous labor can be eliminated and careless mistakes during operation can be prevented.

As seen from the description of the above embodiments and application examples, the present invention has the feature that a plurality of probes are previously set and when the measurement is made, these probes can be selectively used. Furthermore, there is the additional feature that the probes of different detection properties are selectively used and thereby a multipurpose measurement can be made.

By doing so, in the present invention, labor for the replacement of the probes is eliminated and the improvement of work efficiency can be attained. Specifically, this does away with such intricate work requiring much time that, as in a conventional way, each time a probe is replaced with another, a fixed mechanism mounting the probes is removed from the endoscope body and, after the replacement of the probe, is attached again thereto. In this way, the mistake of operation arising at that time can be prevented. Furthermore, it is easy to perform the probe switching operation automatically. In this case, it is favorable that the operation is controlled by the computer in such a way that not only is an alternative probe placed in the scanning condition, but also the distance between the specimen and the probe is increased or diminished before or after the switching operation.

Usually, the necessity for replacing the probe is often recognized during measurement. For example, with a probe on which fluorescent pigment is deposited, the intensity of fluorescence emission decreases with time, but the shape does not change and thus the bleaching of the pigment is generally recognized when the measurement is started. The same holds for the case of probe wear or adhesion of dirt to the probe. In such cases, in the present invention, it is possible that the switching mechanism is actuated and thereby the operation is smoothly transferred to a measurement with a replaced probe.

In addition to the above description, there are cases where measurements are made under special conditions. For example, when a measurement is made in a superhigh vacuum, the probes are contained, together with their peripheral, constituent mechanisms, in a special vessel such as a vacuum chamber. According to the present invention, even in such a case, the probes can be replaced by remote control without opening the vessel.

As already mentioned, it is known that the detection sensitivity varies with the difference in optical property between the specimen and the probe. Hence, the selection of a proper probe must be determined after an attempt has been made to use a plurality of probes in sequence. According to the present invention, however, it is not required that the cumbersome replacement work is done several times as in the conventional way, and a ready determination of the proper probe is made, thus facilitating measurement and discussion for improving the S/N ratio.

According to the present invention, a comparison of the optical property of a probe already known with the detection sensibility derived from measured data shows that the optical property of the specimen being measured can be easily presumed. This is because the detection of light from the probe depends on the difference in optical property between the specimen and the probe. In this case, permittivity or permeability is first considered as the optical property. For example, if a metallic thin film used for a recording medium is observed, it will be seen that there is a large difference in permeability between ferrous metal and non-ferrous metal. Hence, where a metallic or dielectric probe coated with metal is used, a probe coated with different metal is used for measurement, and thereby a measurement can be made according to a difference in material between specimens.

In addition to the permittivity and permeability, a refractive index is considered as the optical property. Since refractive indices of various raw materials are relatively well known, there is a high possibility that, in accordance with the refractive index of a measured specimen, the material of this specimen will be identified. In general, as the refractive index of a probe approaches that of a specimen, a reflectance becomes low. Thus, if a plurality of probes whose reflectances vary according to materials are provided so that they are used in turn to measure detection intensities, the refractive index of the specimen can be presumed, and from this result, the material of the specimen can also be presumed. For the refractive index, the behavior of absorption of metal can, of course, be taken into consideration, and such techniques can be utilized for general measurements on dielectrics and metal as well.

According to the present invention, not only is the probe switching operation easily performed, but also time required for the switching operation is short compared with the conventional operation. This is advantageous with respect to the measurement made under a condition in which much time less cannot be taken as in a case where a specimen changes considerably with time. In this case, if the type of each probe used for measurement is predetermined so that it can be recognized by the computer, the analysis of subsequent data will easily be made and the improvement of work efficiency will be obtained. In order to do so, it is desirable that individual information necessary for discrimination between the probes is imparted to each probe itself. As already mentioned, however, the probe itself is extremely small, and thus it is very difficult in practice to discriminate between the probes in this way. On the other hand, even if such small probes are mounted directly to the switching mechanism, mounting and dismounting work for the probes becomes extremely difficult.

Thus, the present invention, as stated in the above embodiments, is designed so that the probes are previously mounted to the attachments and are mounted to, or dismounted from, the switching mechanism, together with the attachments. Consequently, not only is the mounting and dismounting work facilitated, but also information on discrimination between the probes can be imparted to the attachments. In doing so, the type of each probe mounted to each attachment is previously inputted in the computer, and thereby what type of probe is used for subsequent measurement can be recognized automatically whenever the probe switching operation is performed.

Also, as a functional probe, the fluorescence probe whose tip is coated with fluorescent pigment is known, and the present invention is adapted to use this probe for measurement. With the use of the fluorescence probe, because illumination light from the light source is different in wavelength from fluorescent light, components of the illumination light are cut off by an optical filter, and thereby it is possible to improve the S/N ratio of a detection signal. In the case of the fluorescence probe, the fluorescent pigment is bleached, but according to the present invention, immediately when it is determined that this probe is unsuitable for use because of bleaching, the probe can be switched to a new probe.

Although the fluorescence probe is such that when it approaches a measuring part of the specimen, the emission energy of fluorescence is transferred onto the specimen side, the amount of this transferred energy changes with the optical property of material of the specimen. A measurement for which such a feature is utilized promises well for the future. Thus, if a plurality of fluorescence probes with different fluorescent pigments are used for measurement, the material can be specified by a difference in emission intensity depending on the phenomenon of energy transfer. According to the present invention, such measurement can be favorably made.

The present invention is further advantageous with respect to the case where not only is the probe switched from the viewpoint of the optical property of material, but also a plurality of probes with different shapes are switched. For example, an aperture probe with small aperture has a high resolving power, but is small in amount of detected light. In contrast to this, an aperture probe with larger aperture has a lower resolving power, but is advantageous in view of the amount of light. The same holds for a difference in conical angle at the tip of the aperture probe. Specifically, a probe with large conical angle is small in loss of the amount of light, but is difficult to scan, for example, a structure with deep grooves. Conversely, a probe with smaller conical angle is easy to scan, but causes a greater loss of the amount of light. At present, semiconductor lithography that utilizes the near-field scanning optical microscope is studied. In this case, the present invention can be applied to properly switch and use the probe, and when a probe which is high in power and relatively large in aperture diameter or has a large conical angle is used for exposure and a probe for high resolution detection which has a small aperture or a probe whose conical angle is small is used for inspection, it is possible to achieve both manufacture and inspection with a single device.

Furthermore, the present invention is advantageous when it is constructed so that the kind (wavelength, intensity, spectral characteristic, etc.) of the light source to be used is changed in synchronization with the probe switching operation. By doing so, observations with the fluorescence probe and with the aperture probe that utilizes other wavelengths can be more easily made than in the conventional way. If the light source is changed in such a way that a combination of the probe and the light source is programmed by the computer, a further improvement of measurement efficiency can be obtained.

What is claimed is:

1. A near-field scanning optical microscope for measuring an optical property of a specimen, comprising:

a plurality of probes for observing a surface of said specimen; and a switching mechanism for selecting one of said plurality of probes, wherein said switching mechanism comprises a movable table, said plurality of probes being fixedly mounted to said movable table so that probe selection is made through movement of said movable table.

2. A near-field scanning optical microscope according to claim 1, further comprising a moving mechanism for changing a distance between one of said plurality of probes and said specimen, where said moving mechanism is driven so that the distance increases when said plurality of probes are changed by said switching mechanism.

3. A near-field scanning optical microscope according to claim 1, wherein each of said plurality of probes has a different detection property.

4. A near-field scanning optical microscope according to claim 3, wherein one of said different detection properties corresponds to an optical property of said specimen.

5. A near-field scanning optical microscope according to claim 4, wherein the optical property of said specimen is a permeability.

6. A near-field scanning optical microscope according to claim 4, wherein the optical property of said specimen is a refractive index.

7. A near-field scanning optical microscope according to claim 3, wherein said different detection property corresponds to fluorescent pigment applied to, or contained in, each of said plurality of probes.

8. A near-field scanning optical microscope according to claim 3, wherein one of said different detection properties corresponds to a difference of probe shape.

9. A near-field scanning optical microscope according to claim 8, wherein said difference of probe shape includes a difference in aperture diameters of said plurality of probes.

10. A near-field scanning optical microscope according to claim 8, wherein said difference of probe shape includes a difference in conical angles of said plurality of probes.

11. A near-field scanning optical microscope according to claim 3, further comprising a holding member for supporting each of said plurality of probes, said holding member including information for distinguishing types of said plurality of probes from each other.

12. A near-field scanning optical microscope according to claim 11, further comprising reading means for reading information of each of said plurality of probes supported on said holding member from said holding member and means for switching a plurality of light sources which irradiate said specimen, corresponding to the information from said reading means.

13. A holding member for supporting a probe in a near-field scanning optical microscope comprising:

a data storage element constructed and arranged to record data corresponding to a type of said probe; and electrodes for reading out the data from said data storage element.

14. A holding member for supporting a probe in a near-field scanning optical microscope according to claim 13, wherein said data storage element includes a lead pattern connecting said electrodes corresponding to the type of said probe.

15. A holding member for supporting a probe in a near-field scanning optical microscope according to claim 13, wherein said data storage element includes a memory for storing data corresponding to the type of said probe.

16. A holding member for supporting a probe in a near-field scanning optical microscope according to claim 13, wherein said probe is detachable.

17. A holding member for supporting a probe in a near-field scanning optical microscope according to claim 16, wherein said data includes data of beginning a use of said probe.

18. A method of measuring optical properties of a specimen with a near-field scanning optical microscope, said near-field scanning optical microscope having a plurality of observation probes attached to a movable table, comprising:

moving said movable table until a first selected one of said plurality of observation probes is in position for taking measurements of said specimen;

taking first measurements of said specimen;

moving said movable table until a second selected one of said plurality of observation probes is in position for taking measurements of said specimen; and taking second measurements of said specimen.

19. A method of measuring optical properties of a specimen according to claim 19, further comprising reading data associated with at least one of said first and second selected probes of said plurality of probes, wherein said data read provides information identifying a type of said at least one probe of said first and second selected probes.

20. A method of determining a type of an observation probe selected from a plurality of observation probes attached to a movable table of a near-field scanning optical microscope, comprising:

recording data identifying said type of said selected observation probe in a medium fixed in or to said movable table; and reading said recorded data identifying said type of said selected observation probe.

* * * * *